United States Patent [19]

Easley

[11] 4,253,228

[45] Mar. 3, 1981

[54] APPARATUS AND SYSTEM FOR FORMING WOUND FILTERS

[75] Inventor: William G. Easley, Amarillo, Tex.

[73] Assignee: Filterspun, Inc., Amarillo, Tex.

[21] Appl. No.: 942,282

[22] Filed: Sep. 14, 1978

[51] Int. Cl.³ .............................................. B01D 39/08
[52] U.S. Cl. .............................. 29/564.1; 29/163.5 F;
29/705; 72/402; 242/43 R; 242/43.1
[58] Field of Search ................ 242/43.1, 43 R; 73/38;
33/143; 29/163.5 F, 235, 450, 564.1, 705;
72/385, 402

[56] References Cited

U.S. PATENT DOCUMENTS

| 1,662,529 | 3/1928 | McKinley | 73/38 |
| 2,515,214 | 7/1950 | Goldberg | 33/143 |
| 2,622,652 | 12/1952 | Conroy et al. | 72/402 |

FOREIGN PATENT DOCUMENTS

| 365228 | 9/1906 | France | 242/43 R |
| 576209 | 3/1946 | United Kingdom | 242/43 R |

Primary Examiner—Z. R. Bilinsky
Attorney, Agent, or Firm—Ely Silverman

[57] ABSTRACT

Wound filters of readily varied length are formed by applying yarn to a core on a winding machine utilizing a linkage system that changes the traverse length of the winding apparatus and concurrently changes the rate of change of direction in a ratio different than the ratio of change of traverse length in order to maintain adequately uniform tension during such winding. Such operation also provides for winding yarns of different dynamic characteristics. Apparatus for applying the filters so formed to a variety of support assemblies therefor act on the apparatus formed by such process and apparatus.

8 Claims, 25 Drawing Figures

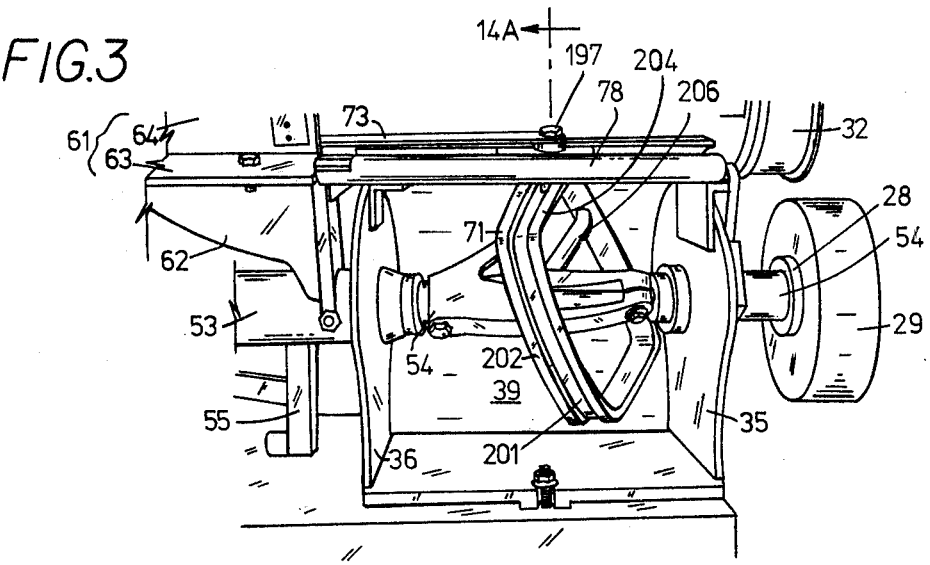
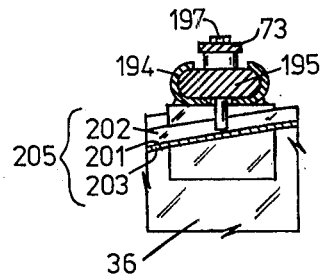
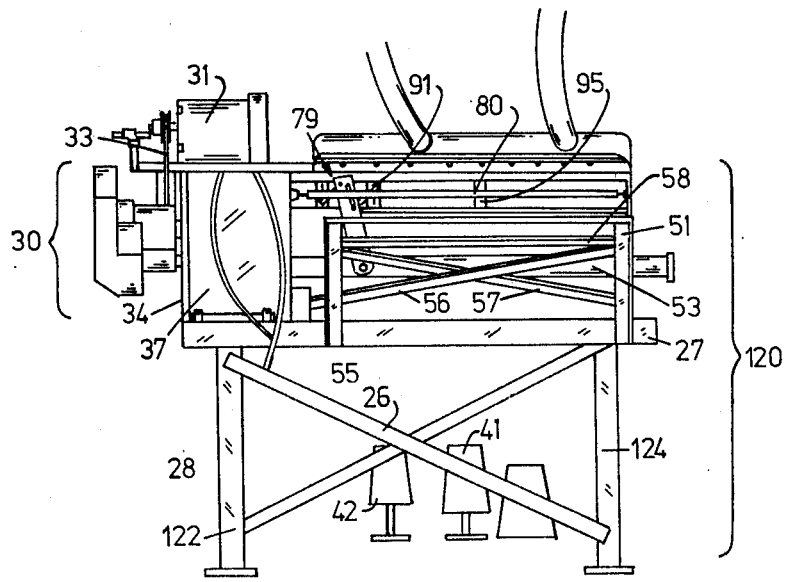

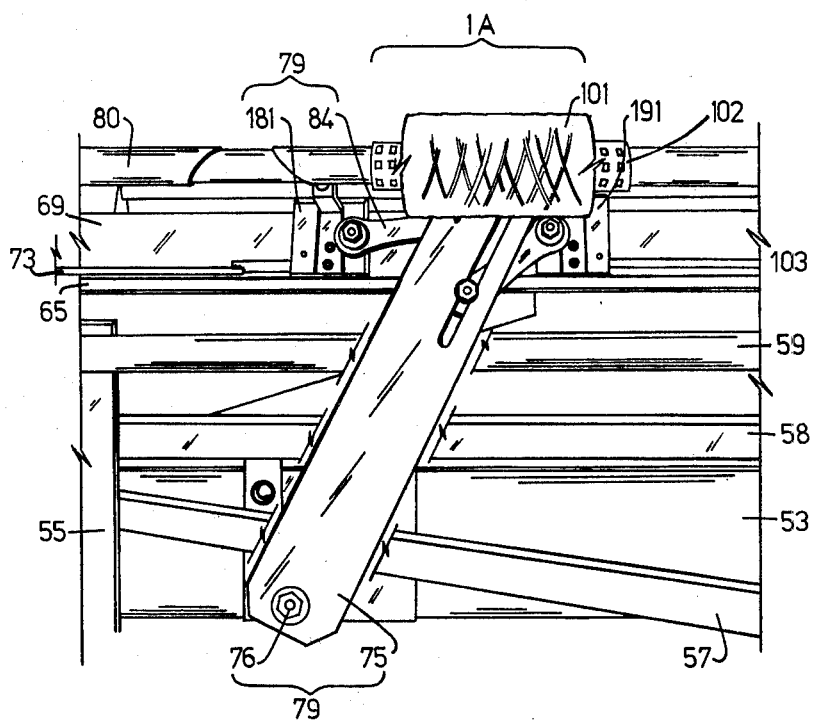
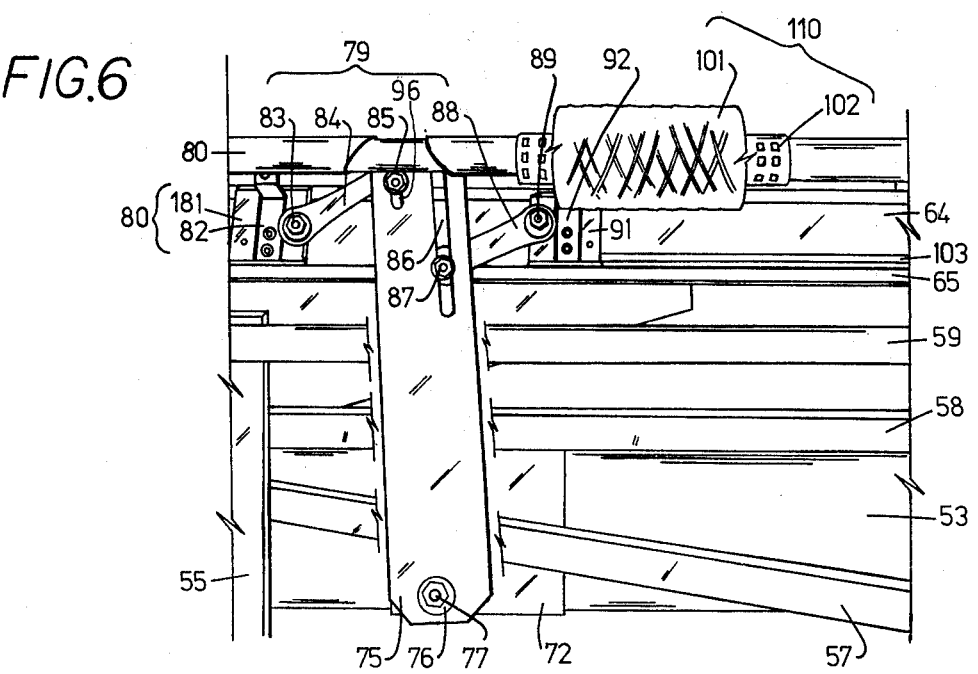

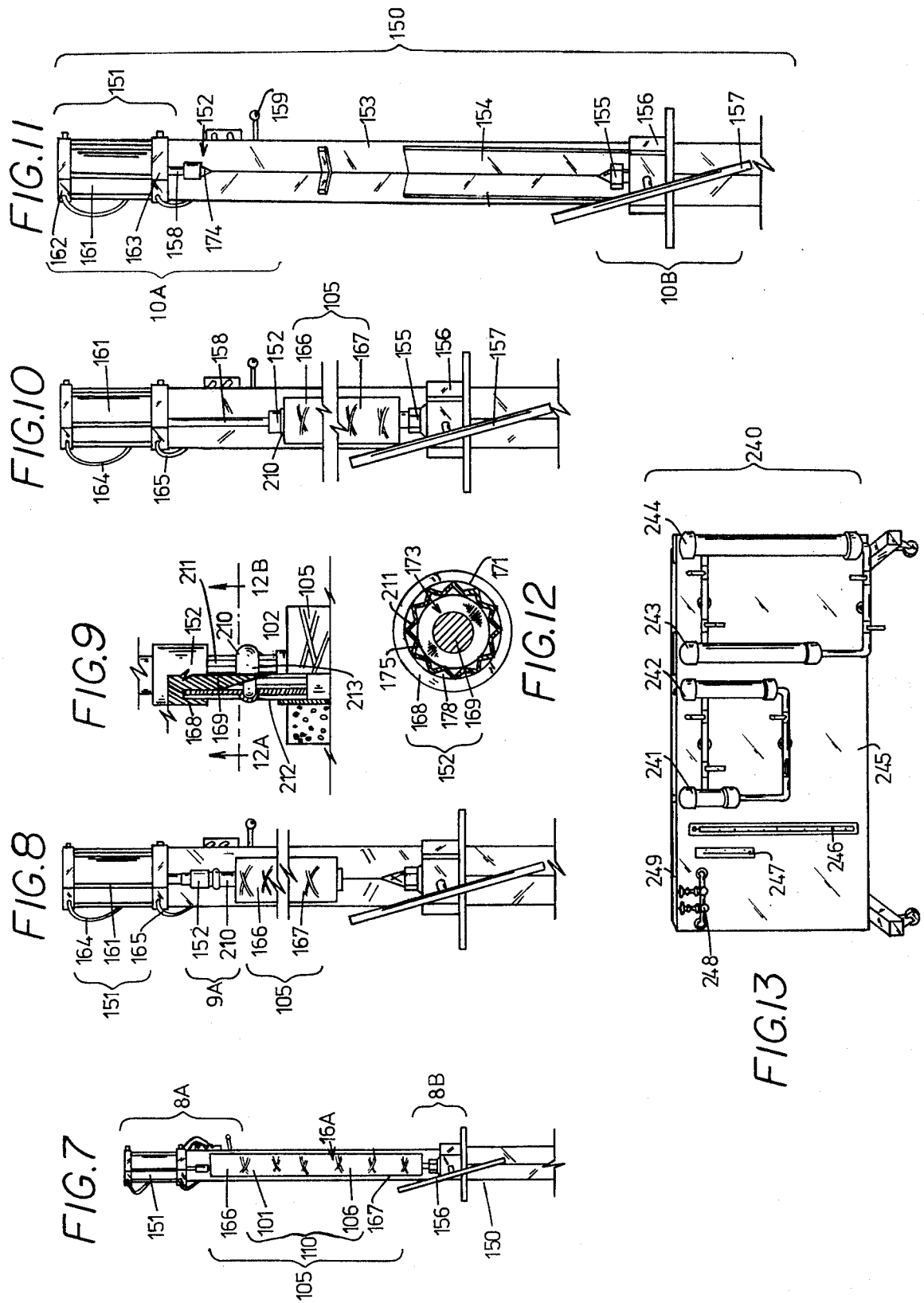

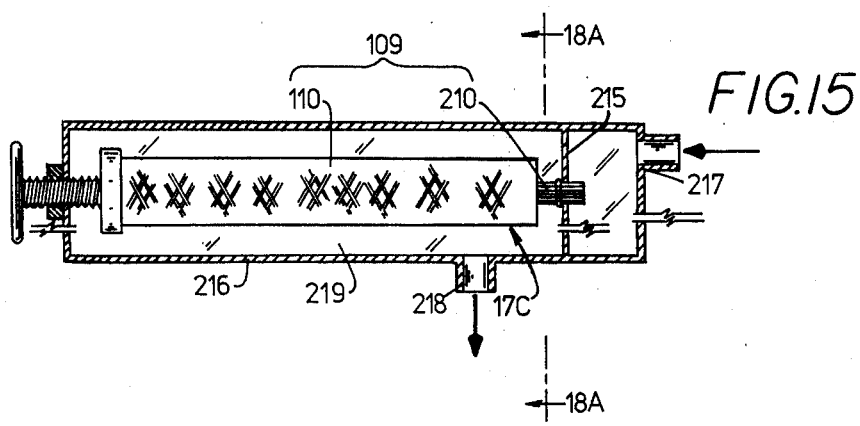
FIG.15
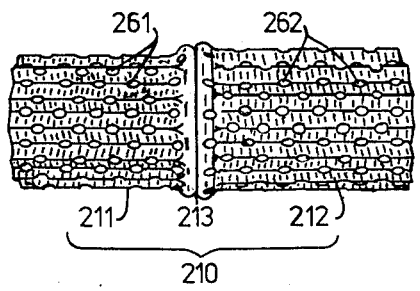
FIG.16
FIG.17
FIG.18
FIG.19
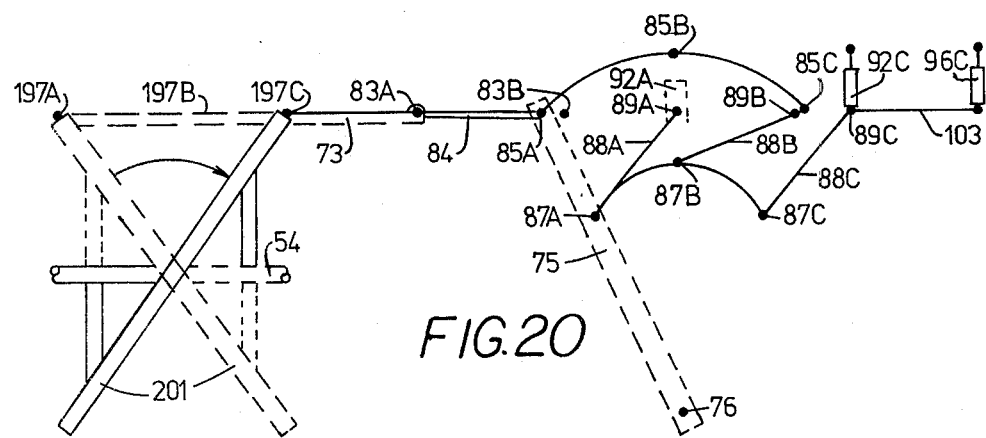
FIG.20

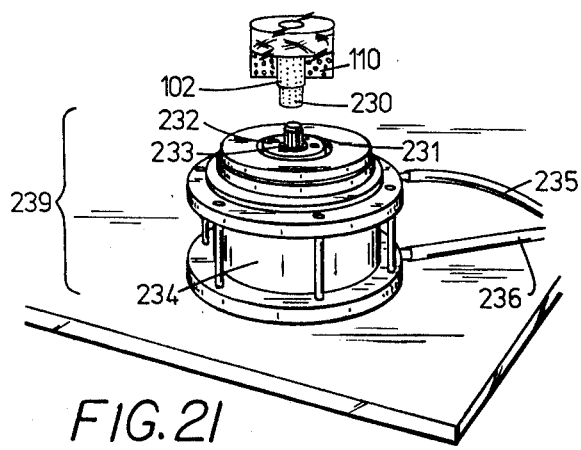
FIG.21
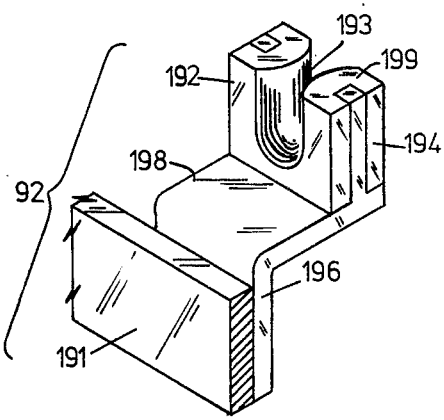
FIG.22
FIG.23
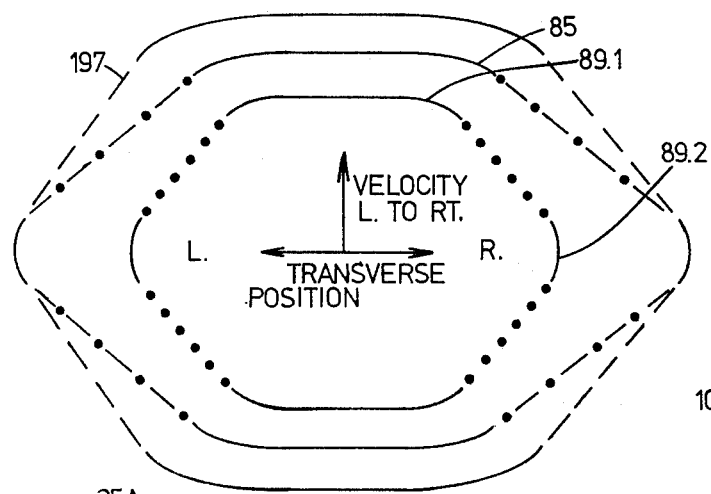
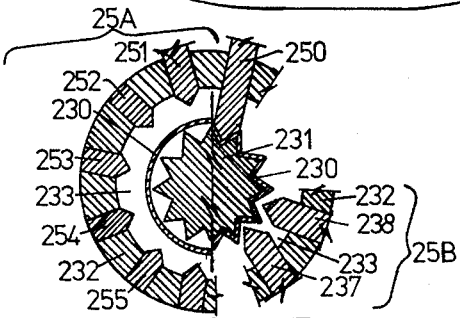
FIG.25
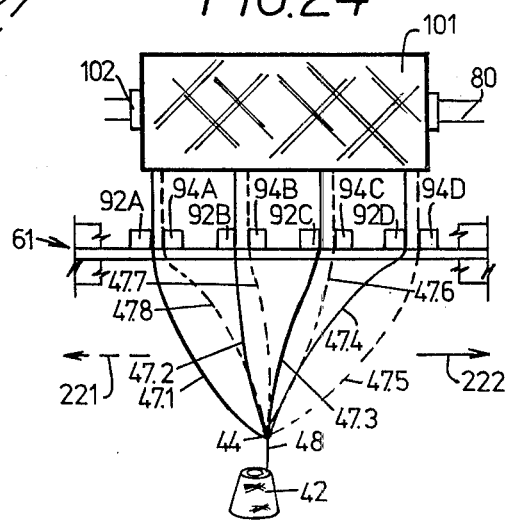
FIG.24

APPARATUS AND SYSTEM FOR FORMING WOUND FILTERS

BACKGROUND OF THE INVENTION

The field of art to which this invention purtains is manufacture of filters.

DESCRIPTION OF THE PRIOR ART

In the construction of wound filter tubes as in U.S. Pat. No. 3,356,226 and 2,368,216 there is the requirement that a barrel cam be used to generate the traverse motion applied to the guides that carry the filaments or yarn to be deposited as a filter tube. In ordinary winding machines there are a limited number of cams that are available in terms of length and shape to install in such machines; thus, most of the wound tubes that are constructed for industry utilize a 10 inch length traverse cam. There are also available a 9 inch traverse cam, 8 inch and 6 inch traverse cam. However, periodically there is a requirement for a tube other than these lengths of cams or multiples thereof.

The barrel cams are made to provide positionings of the yarn guide and a speed of its traverse dependent on the length of traverse for a given type of yarn so that the finished product of such length will have uniform sized hole or orifice in the filter and a uniform action on the to-be-filtered fluid or gas along the entire length of each unit of the filter. Conventional filters also (as shown in FIG. 2) are usually formed by concurrent formation of a plurality of units each wrapped on the same core; accordingly, it is important that each of such units have the same filtering characteristics to avoid that one of such units takes on more of the filtering load than others and that other such units do not take a proportionate share of the filtering operation burden, as by having a greater porosity than the remainder of units, and so vitiate the purpose of the entire filter system.

However, not only are barrel cams expensive to manufacture in variation of (a) unit lengths of wound filter, and/or (b) yarn characteristics of the same length of such filter unit, but such variation in length and characteristics become important inasmuch as wound filter units are usually assembled in multiples of each unit length.

SUMMARY OF THE INVENTION

I have found that the location of the yarn on a wound filter depends on the dynamic characteristics of the cord or yarn used during the process of forming the filter cartridge and these characteristics depend in turn on the length of the filter unit formed and the speed of travel of the guide moving the yarn and the weight of the yarn, and the length of the yarn forming the filter unit from the feed control guide to the traveling guide forming the filter unit.

The principle of this mechanical device and process is to utilize a linkage and crank arm device to alter (a) the relative speeds of each of the increments of transverse travel of the yarn as well as (b) the total distance of transverse travel imparted to the yarn as it is deposited during tube winding. The change of acceleration at the end of the traverse paths is changed at different ratios than the ratio of final length of traverse of the yarn guide to the length of initial traverse of the yarn guide. Also, the relation of terminal acceleration to usual velocity of the yarn guide may be varied to accommodate the winding operation to yarns of different dynamic characteristics at a given length of traverse of the yarn guide. The instant apparatus and process provide for (a) varying the length of each unit of wound filters as desired and (b) improving the uniformity of production and operation of wound filter tubes, and, also, (c) permitting a variety of yarns of different characteristics to be used for a given unit length of filter tube and (d) simplify manufacture of cams used for round filter tube production.

BRIEF DESCRIPTION OF THE DRAWINGS

FIG. 3 is an enlarged view of zone 3A of FIG. 2 with the front cabinet cover 38 removed to show the interior of cam chamber 39.

FIG. 4 is a rear overall view of the apparatus 120 shown in FIG. 2, but with crank arm moved counter-clockwise.

FIG. 5 is an enlarged rear view of zone 1A of FIG. 4 in a position of its parts where at the crank arm 75 is at a clockwise position (clockwise as shown in FIG. 5) relative to its pivotal support, bushing 76 and pin 77 and parts of the wound unit filter body length on core 102 and elements 57, 58 and 59 removed to show parts of link assembly 79.

FIG. 6 is a view of parts shown in FIG. 5 but whereat the crank arm 75 is located in a substantially vertical position.

FIG. 7 is a diagrammatic overall view of an apparatus 150 for adding connector pieces as 210 to the wound filter body 110 formed by the operation of apparatus 120.

FIG. 8 is an enlarged composite broken away views of zones 8A and 8B of FIG. 7 at an initial stage of operation of apparatus 150. FIG. 8 shows in its topmost portion the structures adjacent to the upper end of the filter assembly 105 while the lower portion of FIG. 8 shows the lower end of the filter assembly 105 during the process of addition of the end piece to such assembly.

FIG. 9 is an enlarged view of zone 9A of FIG. 8. It shows, partly in vertical longitudinal section through the central longitudinal axis of the cylindrical assembly 101, details of the structures used during operation of the apparatus 150 on assembly 105 and adapter 210.

FIG. 10 is a composite of broken away views as in FIG. 8; it shows the upper and lower sections of the assembly apparatus 150 during operation of that apparatus 150 following the initial location of an assembly as 105 and unit 210 in the apparatus 150. The stage of operation shown in FIG. 10 is subsequent to the stage of operation shown in FIG. 8.

FIG. 11 is an enlarged view of the assembly apparatus 150 when it is empty; such apparatus is used to support and align assemblies as 105 during operations as shown in FIGS. 7, 8 and 10.

FIG. 12 is a transverse section view through the plane indicated as 12A-12B in FIG. 9.

FIG. 13 is a diagrammatic view of a testing apparatus used to test the assembled apparatus 109 formed by the process of operation shown in FIGS. 1–12.

FIG. 14 is a vertical sectional view taken along the plane 14A of FIG. 3, which plane is transverse to longitudinal axis of cam drive shaft 54 and passes through center of guide bolt 197.

FIG. 15 is a diagrammatic view of a filter apparatus utilizing the assembled apparatus 109.

FIG. 16 is a side view of a core adapter connector 210.

FIG. 17 is a diagrammatic view along the section 17A, 17B, 17C and 17D of FIG. 18 to show details of the structure of a completed apparatus 109 in zone 17C of FIG. 15.

FIG. 18 is a vertical sectional view along plane 18A–18B of FIG. 15, that plane being transverse to the central longitudinal axis of core 102 and cylindrical filter body 110, with perforations in tube 102 not shown.

FIG. 19 is a pictorial view along the direction of arrow 19A of FIG. 1.

FIG. 20 diagrammatically shows the angular and distance relations of the slot 201, links 84 and 88, yarn guides 92 and 96 and crank arm 75 and pins 85, 87 and 89 during operation of the apparatus 120.

FIG. 21 shows a joining apparatus used according to the process of this invention.

FIG. 22 shows an enlarged view of parts of guide 92.

FIG. 23 diagrammatically shows the paths of movement of the pins 85, 89 and 197.

FIG. 24 diagrammatically shows the relative position of the lengths of yarn length as 47 during motion of the yarn guide 92 during its traverse parellel to the length of the core 102 on the mandrel 80 while forming the assembly 105 during operation of the apparatus 120.

FIG. 25 shows an interior detail of apparatus of FIG. 21 in section and with different parts in different operation stages.

DESCRIPTION OF THE PREFERRED EMBODIMENT

Figure 1:
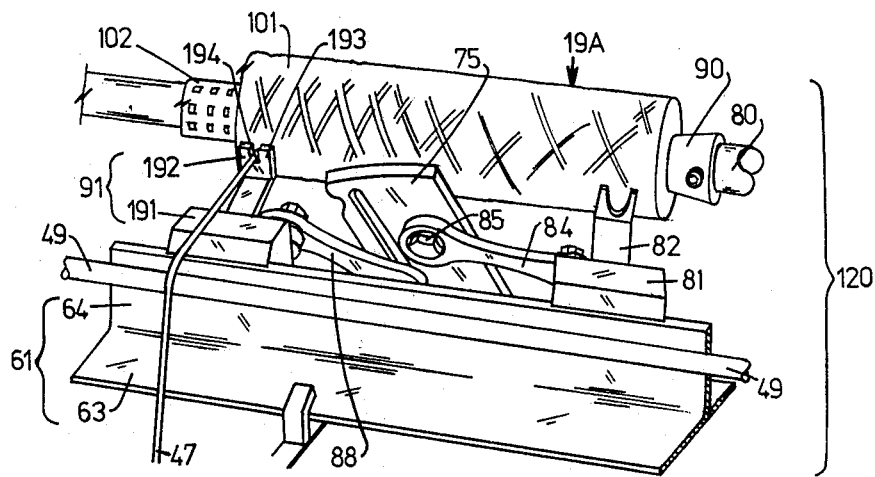
FIG. 1 is a view of structures at zone 1A of FIGS. 2 and 5. This view is taken in a downwardly oblique direction: it shows a unit filter body length 101 of a multiple unit wound filter body 110 in process of its formation by apparatus 120 on the spool or core 102.

Generally, as illustrated in FIGS. 1, 2, 5, 18 and 19 a tubular filter element 105 composed of a plurality of layers of fibrous strands 100, more specifically soft yarn or roving, wound in a diamond weave upon a pervious core tube 102 is formed as an open mesh fabric or netting in a plurality of layers of axially spaced and crisscrossed convolutions that are superposed in the several layers, thereby forming diamond-shaped apertures as 104 between the cross strands that are in alignment, at least in part, to form filtering passages or tunnels through the winding from the circumference to the pervious core tube 102.

Due to the manner of winding the roving or yarn one axis of a cross-section of each diamond-shaped passage as 104 lies substantially in the circumference of the filter while the other axis of the passage is parallel with the axis of the filter. The circumferentially disposed axes of the passages are longer than the axially disposed axes for a substantial part of the thickness of the element 105. The filter element 106 is made by the machine 120 illustrated in FIGS. 1–6. The machine so far as the winding of the strands is concerned, may be essentially a well known Universal winding machine which includes a rotatable mandrel as 80 on which the tube or core 102 is placed for winding of the yarn, but any similar machine may be used. The machine has yarn guides as 92 each of which is reciprocated in front of the mandrel as 80 in timed relation with the rotation of the mandrel to lay on the strands.

More particularly, the overall spinning apparatus 120 comprises a base frame 130 and a spinning assembly 30, the base frame 130 supporting the spinning assembly 30.

The base frame 130 comprises a rigid vertical left front leg 121, a right front leg 123, a rear left leg 122 and a rear right leg 124, all legs are vertical and rigid. Diagonal numbers as 25 and 26 are firmly attached to the legs for diagonal strengthening. The legs 121–124 support a frame table 27. Table 27 is a flat horizontal rigid plate.

Figure 2:
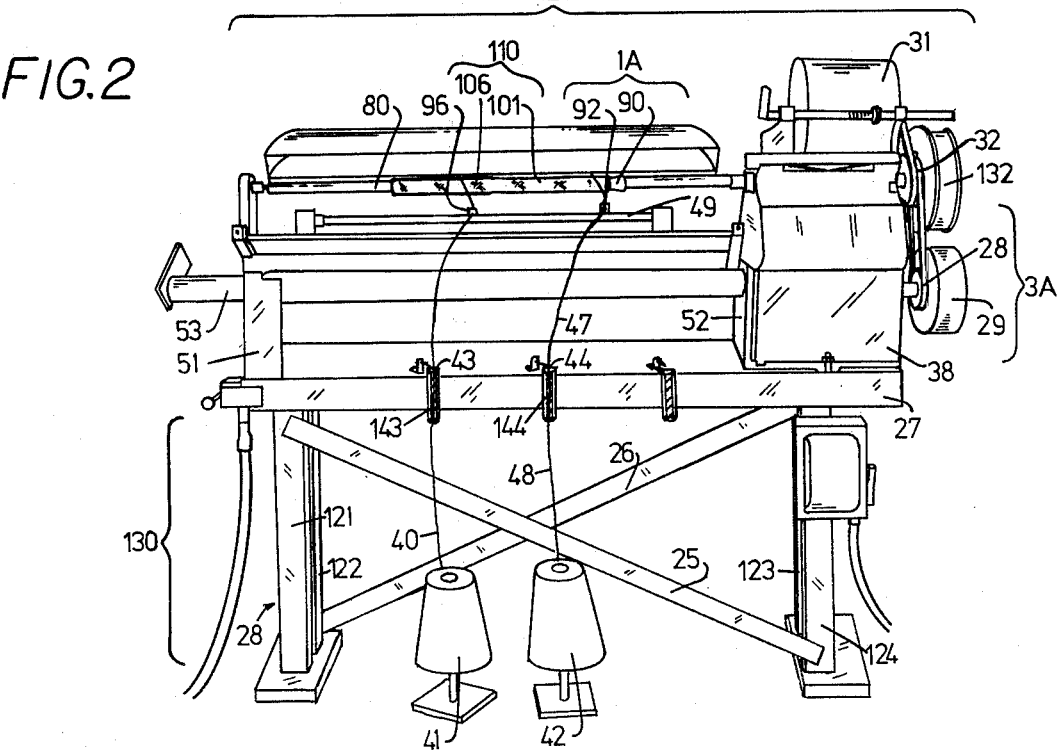
FIG. 2 is a front overall view of the apparatus 120 operating according to the process of this invention forming a plurality of the like wound units 106 and 101 of the multiple unit wound filter body 110.

The spinning assembly 30 has a conventional electric drive motor 31 which is attached to a first belt pulley 32 through a drive belt 33 and that belt and motor also drive a flywheel 29 through a second pulley 28. A motor support cabinet 34 is firmly attached to and supported on base frame 130 by attachment to table 27. The motor 31 is firmly supported on the motor support cabinet 34. The motor support cabinet 34 comprises a rigid left vertical wall 36 and a rigid right vertical wall 35, a rigid rear vertical wall 37 and a pivotally movable front wall 38. The walls 35–38 surround an interior cam chamber 39. FIGS. 2–4 are pictorial and show the shape of the walls 35, 36 and 37 which are firmly joined together.

A left hand mandrel support pillar 51 and a right hand mandrel support pillar 52 are supported on table 27 as shown in FIGS. 2–4. A sturdy rigid frame tube 53 extends horizontally and is firmly attached to plate 36 and pillar 51 both of which are firmly attached to rigid table 27. The fly wheel 29 is rotatably supported on straight rigid shaft 54 and that shaft 54 is rotatably located in bearings 67 and 68 in the plates 35 and 36 respectively.

Pulley 32 and a fly wheel 132 are rotatably supported on the cabinet 34 by a rigid mandrel or spool drive shaft 80 and the rotative movement of the pulley 32 drives the shaft 80 and fly wheel 132.

The vertical pillar 51 is firmly connected to table 27 and to diagonal truss members 56 and 57 (and to a horizontal member 58) to insure its firm position relative to plate 36.

A rigid T-shaped guide rail 61 is firmly held at its ends by fishplates as 62 against the rigid vertical plate 36 and pillar 51. This T-shaped rail 61 comprises a lower horizontal cross plate 63 and a horizontally and vertically extending web plate 64. The rear portion, 65 of the horizontal cross plate 63 provides a slideable support for link plate as 181 and 191 of assemblies 81 and 91 and like assemblies as 95.

A drive cam 71 is firmly attached to the shaft 54. That cam is located with some portions thereof on the left side of a vertical plate 14A transverse to the axis of shaft 54 and other portions thereof on the right hand side of such plane (plane 14A as viewed in FIG. 3. The cam 71 comprises a rigid ring 205 which ring has a U-shaped cross-section; it has a radially open guide slot 201 therein. The ring 205 has a raised front rail 202 (on the left side of that slot as shown in FIG. 3) and a raised rear rail 204 (to the right of slot 201 as shown in FIG. 3). The slot 201 has a rigid bottom portion 203 which joins the rails 202 and 204 to form a C-shaped configuration radially open in a manner to engage the lower end of a rigid guide bolt 197 and move that bolt leftwards and rightwards as shown in FIG. 3. The rim or ring 205 is held by a plurality of rigid radially spaced apart and radially extended spider arms as 206 that extend from shaft 54 to ring 205 and hold the ring in fixed spatial relationship to the shaft 54 and rotate therewith.

The slot 201 extends horizontally as well as vertically and from front to rear in chamber 39 in a slightly curved surface extending at an acute solid angle to the longitudinal axis of cam drive shaft 54, as shown in FIG. 3. The path provided by the slot 201 is generally, as shown in FIG. 3 (and in FIG. 23, in dashed lines as a resultant) complexly shaped with (a) rounded corners and (b) edges curved in two mutually perpendicular planes so as to form a uniform diamond-shaped pattern by the cords as 100 in the finished filter mass 106 at one particular length or distance of traverse, or horizontal movement, of the pin 197, notwithstanding the complexities of factors involved in forming such mass 106.

A rigid crank arm support plate 72 is firmly fixed on to the rigid frame tube 43 and firmly supports a crank arm pivot pin 77. The crank arm base pivot pin 77 pivotally supports a crank arm base bushing 76 and a crank arm 75 is pivotally located on the bushing 76. The crank arm 75 is a flat rigid elongated plate of rectangular outline as shown in FIGS. 1 and 6; it has (a) a lower circular opening for base bushing 76 and (b) an upper circular hole or opening for the driven pin 85 of the driven or slave input link arm 84 and (c) a vertically extending slot 86 for location of the drive pin bushing unit 87 of slave (or driven) output link 88. The pin and bushing unit 87 is adjustably yet firmly located along the length of the slot 86 for pivotal support of one end of the slave output link 88. The slot 86 extends downwardly from the level or height of pin 85 in the vertical position of arm 75 as shown in FIG. 6 and is usually far below the level of pin 85.

A horizontally extending first rigid master or drive link arm 73 is held at one (right end as shown in FIG. 3) end at the upper end of a vertical rigid cylindrical bolt 197, the lower end of which bolt 197 moves in slot 201 of the cam 71. The lower end of bolt 197 engages the rails 202 and 204 at the sides of the slot 201 in the rim of cam 71 and is thereby moved leftwards and rightwards as the fly wheel 29 and shaft 54 rotate.

A slave input link assembly 81 comprises a base slave input plate 181, a slave input yarn guide plate 82, a slave input link pin and bushing unit 83 and a slave input link arm 84. The slave input link arm is a rigid plate or bar and is pivotally connected to pin and bushing assembly 83 and to input arm driven pivot pin 85. Link arm 84 is flat and extends vertically and leftward and rightward and is in all positions perpendicular to the axes of pins 83 and 85.

A slave output link assembly 91 comprises a base slave output plate 191, a slave output yarn guide 92, a slave output link drive pin and bushing unit 87 and a slave output link arm 88. Link arm 88 is flat, rigid and extends vertically and in left and right directions and is pivotally connected to input drive pin and bushing assembly 87 and output arm driven pivot pin and bushing 89 of output link arm 88.

The drive pin and bushing unit 87 is located adjustably at a position along the length of the slot 86. Pin 85 is firmly located in plate 75 at a distance from the pin 77 greater than the distance of the pin 87 from pin 77. The yarn guide assembly 92 is firmly fixed to the link plate 91 as shown in FIGS. 1, 6 and 22. The path of the length of the bolt 197 in slot 201 accordingly controls the movement of the bolt 197 and the drive arm 73 attached thereto; on leftward and rightward motion of bolt 197, arm 73 and the link plate assembly 81 moves leftward and rightward (as shown in FIG. 3) respectively and drive pin 83 of the input link arm 84 and the input link arm pin 85. The upper end of crank arm 75 is, by that action of the arm 84, moved to pivotally rotate about the bushing 76 and in turn moves the bushing unit 87 of output arm 88 in a rightward (as shown in FIG. 6) direction. This movement of arm 88 moves the second link plate 91 and guide assembly 92 therewith. The horizontal motion of assembly 92 and the plate 91 is less than the horizontal motion applied by cam 71 to the arm 73 and, also, to plate 81 only generally by the ratio of the distance of pin 85 from pin 76 to the distance of pin 87 to pin 76; the variation from said ratio is important to the operation of the link assembly 79.

The movable yarn guide unit 92 comprises a rigid vertical base arm 196 and upper left arm 192 and upper left guide arm 194 with a guide space 193 therebetween. Yarn guide units 92 and 96 are identical in structure. The vertical base as 196 is a rigid plate that extends vertically and is firmly fixed to the base slave guide plate 191; it has an upper rear rigid horizontal plate portion 198 fixed to the top of 193 and extending rearwardly thereof. The rear of top flat plate 193 supports a left guide arm as 192 and a rigid vertical yarn guide arm 194. These guides are rigid vertically extending plates convexly curved in the direction of space of 193. The yarn is drawn through the space 193. The vertical base arm 196 extends above the guide plate 191 to the vertical level of the axle 80. The plate 198 extends rearwardly from plate 193 to a point in front of the maximum thickness of the core or spool 102 generally as shown in FIG. 1.

On initial movement from the leftward position of pin 197, generally as diagramatically shown in FIG. 20, to its right-hand position 197C (as shown in FIG. 20), the pin 85 moves in an upwadly slightly convex path from position 85A to position 85B to position 85C as shown diagramatically in FIG. 20. The same relative motion occurs as shown in FIGS. 5 and 6. During this travel of pin 85, pin 83 moves only in a horizontal path. During such period of movement the pin 87 moves from position 87A to position 87B to position 87C as shown in FIG. 20. During this movement of pin 87, the length of link 88, as measured from pin 87 to pin 89, moves initially at a much greater angle to the horizontal than the path of pin 85 during movement from position 85 to the position shown as 85C. Position 85A is at maximum counterclockwise position of crank arm 75 and position 85B is at the vertical position of crank arm 75. The horizontal motion of the pin 87 relative to pin 76 is much less than the ratio of distance from point 85B from pin 76 to the distance of pin 87B from pin 76. The horizontal motion of pin 87 is reflected as the horizontal motion of pin 89 which becomes the horizontal movement of assembly 92. The assembly 92 moves from the position 92A to the position 92C in one half cycle the motion of the crank arm 75, i.e., that half cycle of motion being of motion of crank arm 75 from its maximum counterclockwise position shown in dashed lines in FIG. 20 to the maximum clockwise position of that crank arm and, at such maximum clockwise position of the crank arm 75 the pin 85 position is shown at 85C and the pin 87 is shown as position 87C. At the vertical position of the crank arm 75, the position of pin 87 is shown as 87B and the position of pin 85 is shown as 85B. For pin 87 at its positions 87A, 87B and 87C respectively, the position of pin 89 is shown as 89A, 89B and 89C respectively in FIG. 20. At the positions 89A and 89C the position of unit 92 is shown as 92A and 92C with the relations of pin 89 and unit 92 as shown in FIGS. 5, 1 and 20. The position of unit 92 which corresponds to the position in FIG. 5 is not shown in FIG. 20, for clarity of presentation in that FIG. 20. Unit 96 is connected to unit 92 by the link 103 (shown in FIG. 5) as diagrammatically shown in FIG. 20; accordingly the link 103 causes units 92 and 96 to move together; one such concurrent position is shown for position 92C and 96C in FIG. 20. Accordingly, as shown in FIG. 23, the link assembly alters the relative motions of the yarn guides during path of motion of the yarn guides as 92 and 96 while altering the length of horizontal path of the yarn guides so their acceleration and deacceleratin is changed so that they have a lesser acceleration at the horizontal ends of their traverse, (i.e., adjacent points as 85A and 85C) than the ratio of (a) distance from pin 76 to pin 85 relative to (b) the distance of pin 76 to pin 87A times (c) the acceleration at the ends of the traverse of the yarn guides prior to connection of the link assembly 79 between arms 73 and such yarn guides, as 92.

The linkage assembly 79 comprising arm 75 and links 84 and 88 and pins 76, 87, and 85 connected thereto make gradual the change in cord position at the ends of the traverse path of the yarn guides as 92 (and 96) and produces minimum changes in the tension of the cord at such positions during winding of such cord on the core 102, which is attached to shaft 80.

In the operation of apparatus 120, units of wound filter threads as the unit filter body 101 and 106 are wound on core 102 and several units as 101 and 106 form the multiple unit wound filter body 110; with 102, the core, a filter assembly 105 is made; with the adapter unit 210, extended unit 109 is formed. Core 102 is common to several units, as 101 and 106, forming the multiple wound filter body 110.

In operation the yarn of which the cartridges as 102 is formed is drawn from spools as 41 and/or 42 through a spring-loaded fixed guide as 43 and/or 44 respectively, past moveable yarn guide units as 92 and/or 96. Such yarn is wound on the core 102 to form the mass of thread 110 of the filter assembly.

In operation of apparatus 120 a portion of yarn as 48 moves past the fixed guide 44 and therefrom, by one of several paths, e.g., 47.1 to 47.8 shown in FIG. 24, is firmly wrapped around core 102 to form the wound filter body as 101 or 106.

When the yarn guide 92 moves in the direction of the arrow 222, i.e., from the left toward the right, the portion of the cord 47.1 is curved convex to the left and is engaged by the surface of arm 192 of guide assembly 92 (shown as 92A in FIG. 24). As the arms 192 and 194 are moved to the right at substantially constant velocity the portion of yarn between stationary spring-loaded guide 44 and the traversing yarn guide 92 will be convex again to the left in positions 47.2 and 47.3 and 47.4. During this path portion the yarn guide 92 is moving axially of rail 61 at a relatively constant speed and the shaft 80 is also rotating at a relatively constant speed to drive the core 102 (which extends parallel to rail 60) at a constant rotative speed so that the characteristics of the yarn distribution on core 102 are those of a constant speed rotation as well as a constant speed traversed by the yarn guide across such core. The movement of the yarn increments from position of guide 44 towards the yarn guide 92 provides an inertial resistance of each increment of yarn drawn past the fixed yarn guide 44 to guides as 92 due to the yarn movement transverse to the distance from guide 44 to the reel drive shaft 80 and so provides the convex shape of such yarn portion as shown in FIG. 24 and FIG. 2.

When the yarn guide 92 is at yarn position 47.2 its arm 192 is in contact with the moving portion of yarn 47.2 as shown at 92B in FIG. 24. In the position shown as 47.3, also, the arm 192 is in contact with the yarn as shown at 92C in FIG. 24. At yarn position 47.4, at the righthand end of the traverse of the yarn guide 92, the lefthand arm 192 is only initially in contact with the yarn 47.4. When the yarn reverses its motion to direction as shown by the arrow 221 at the yarn guide position shown by 92D and 94D in FIG. 24 the momentum of the yarn, dependent upon its stiffness and weight as well as the rate of travel from 44 to the spool 102 rapidly assumes a shape which is convex to the right as shown by the dashed lines in FIG. 24. Thereafter, at position 47.5 the yarn portion is in contact with the righthand arm 194 as shown at position 94D in FIG. 24. Continued constant speed movement from the right to the left provides that the arm guide 194 urges the yarn to the left with the yarn between guide 44 and 92 having a curvature which is concave to the left while the arm 194 provides for pressing that yarn towards the left as shown by 94D, 94C and 94B contacting the yarn at successively leftward yarn positions 47.6 and 47.7. At the end of leftward motion of the guide 92 the arm 194, as shown by position 94A of FIG. 24, is urging the yarn to the left and the yarn has a curvature which is concave to the left. The momentum of the yarn then moves it leftward to a shape which is convex to the left, which is shown by the dark line 47.1 in FIG. 24. The reversal of the motion of the yarn guide 92 to move in a direction to the right (as shown by arrow 222 in FIG. 24) causes the left guide arm 192 to engage the yarn portion and to move that yarn portion from the position shown as 47.1 to the position shown as 47.2. While moving from 47.1 to 47.2 the yarn has a shape which is convex to the left as shown in FIG. 24. It is to be noted that this description of the usual method of forming a cord provides that at a given speed of formation of the unit, i.e., with the barrel cam 71 rotating at a constant speed and a change in length of traverse being provided by the linkage assembly 79, that the ratio of acceleration at initial traverse length to the acceleration at decreased traverse length provided by the linkage assembly 79 is a lower ratio than the ratio of the distance of pins 87 and 83 to the pin 76. This is because of the action of the yarn at the terminal portions of the traverse path of the yarn guide 92, as shown in FIG. 24, is the result of inertia of the yarn portion between guide 44 and yarn guide 92: that portion maintains the tension in the yarn during the time of change of direction from 221 to 222 and vice versa, if yarn tension is lost or largely lost, then the yarn will not be firmly wrapped on the mass of threads 101 at the end of that mass and it is critical to the stability of the mass of threads 101 that its ends be firm. If the tension on the yarn be proportionately as great for a smaller traverse as it was for a larger distance of traverse, on the resultant excessive rapid movement of yarn from orientation of 47.4 to 47.5 the spring 144 of guide 44 yields and more yarn is passed to the core 102 during a set distance of longitudinal or circumferential travel of the core 102 and mass of yarn 101; accordingly the tension in the yarn is then lost in the mass 101 as the yarn moves from a position 47.1 to 47.2 and from 47.4 to 47.5. The apparatus of this invention provides a definite lowering of the tension in the yarn at such phase of operation and so provides a substantial or effective uniformity of tension for the entire path of traverse of the increments of yarn passing from guide 44 to guides as 92 so that the yarn tension will be uniform. A ratio of change in acceleration that is linearly proportional to the change in length of traverse path does simply not maintain a uniform tension at the ends of the traverse path while the change provided by linkage assembly 79 which is disproportionately less than the traverse length does maintain a uniform tension in the yarn during its travel, including at time of reversal of traverse direction.

By reducing the intensity of deacceleration and acceleration at the end of traverse as is done by the linkage assembly 79 to a greater degree, (as shown in FIG. 23) than the change in length of traverse (by the ratio of distance from pin 76 to pin 85 relative to the distance from pin 76 to pin 87) a uniform tension is provided in the yarn during the portions of motion thereof when the direction of motion is reversed as at positions 47.1 to 47.2 and 47.4 to 47.5. If such motion is not provided the distribution of tension and of the yarn on the finished filter cartridge is not uniform.

FIG. 6 shows a slot 96 used in place of a hole for location of driven pin 85 (as shown therefor in FIG. 1).

The use of the linkage 79 and the relations shown in FIG. 20 allow a variety of weights of yarn to be used for different filter cores, which variety has not heretofore been available for use because of variations of stiffness and impact development and weight per unit length of yarn. The available alterations of the position of pin 85 in an upper slot 96 provides for variation in the path 85A, 85B and 85C while variations in the position of pin 87 in slot 86 provide variations in the form of the arc between points 87A, 87B and 87C. Accordingly, the ratio of velocity and acceleration at different points in the path is readily varied. All of these paths have in common that the acceleration at the end of the traverse is much less than the ratio of the distance from (a) the pin as 87 (closer to the pivot pin 76) and 76 and (b) the pin, as 85, (further removed on the crank arm 75 from the pivot pin 76) to pin 76.

In FIG. 23 the movements of pins 97, 85 and 89 are diagrammatically shown relative to each other during traverse of the yarn guide 92. The position of pin 197 is shown as a dashed line. Its position changes rapidly with time at its ends although fairly uniform in velocity at its center portion (197.2). The position of 85 is shown by a series of dots alternating with dashes. As pin 85 is connected to pin 83 and link 73 through the pivotal link 84 that pin has the same velocity characteristics at the left and right extremities of motion of the crank arm 71, but, because of the angle provided by the link 84, has a reduced speed at the center portion of travel of the crank arm 75 between its extreme counterclockwise position shown in FIG. 20 and its clockwise extreme position as shown in FIG. 1 and FIG. 5. The position of pin 89 during its traverse is shown in the series of 6 dots followed by a continuous line in FIG. 23. Because of the angular relations of the link 88 to the path of movement of the pin 89 at the extremes of position of the crank arm 75 the pin 89, as shown in FIG. 23, has less of a horizontal motion than does the pin 197 or 85 and this reduction in horizontal motion is a greater reduction than the reduction in transverse motion due only to the ratio of distance of pin 85 to pin 76 relative to the distance of pin 87 to pin 76.

In FIG. 23 the vertical distance shows the velocity while the horizontal distance indicates the position of the yarn guide 92 at positions between its leftmost traverse position, (shown at the left of FIG. 23) and the rightmost position of its traverse (shown at the right-hand end of FIG. 23).

By adjusting pin and bushing unit 87 to a fixed position in the slot 86 cut parallel to the main crank arm in this device the effective travel of guides as 92 and 96 driven by a cam 71, which has a 10 inch travel, to any travel between 12 and ½ (12½) inches and 7 inches is effected; similarly, when the 6, 8, or 9 inch cams are used, their effective travel can be precisely altered to give a repeatable and predictible tube length of any range down to less than 4 inches and (by changing connection of link 84 to pin 87 and of link 88 to pin 85) more than 12 inches with excellent uniformity of product. This allows a great deal of flexibility in altering the length of the filter tube while providing a uniform product; it also requires, or allows, that far fewer changes in cams in the basic winding machine be accomplished in order to make available in standard production these tubes of varying lengths. More than 2,000 filter tubes in varying lengths between 4 and 12 inches have been made utilizing this device. In the three bar linkage system 79, each pivot point is supported by a roller bearing and one slot position for one of the two linkage that are used in the unit. Both the master link 84 attached to the crank arm and the variable link 88 that has one end placed in a slot 86, and allows the travel of the yarn guide button to be varied, are supported by slider block mechanisms using a Nylotron ® bearing to support them as they are in a motion. The entire mechanism 79 weighs approximately 20 pounds and can be lightened by using lighter alloys. By utilizing the lighter alloys such as forged aluminum or magnesium, the weight of the unit and thereby, since it is in motion, its impact on reversal can be further significantly reduced. The length of crank arm 75 in a preferred embodiment is approximately 12 and ¼ inches from center bearing pivot 76 to outer tip. The lengths of the tie bar links 84 and 88 attached to it are then 3 and ½ inches (3½ in.). The separation between the adjustable slot position of one link bar 88, and the fixed length bar 84 is 3 inches. This is done so that in utilizing a 10 inch cam as cam 71 if it is desired to have no change in cam traverse motion imparted, the sum of the elements' length is 10 inches or equal to the basic travel of the cam. This is done in order to have a horizontal unit position when no change of the basic cam length is required yet allows changes in velocity characteristics of yarn guides as 92 to accommodate to yarns of differing densities and stiffnesses, i.e., polypropylene and fiberglass—on the same length of cylinder, as such different materials are needed for use as filtering elements in different chemical environments. The particular filter element 110 shown in FIGS. 1–10 has a 2½ inch outside diameter and the core 102 thereof has a 1 inch inside diameter and the yarn is a napped cotton yarn of 1/16 inch (1.5 mm.) diameter. With crank arm 76 having a 10 inch travel and the above described links 84 and 88, the assembly 79 and apparatus 210 provides for a 360° rotation of shaft 54 and/or a movement of each guide as 92 from leftmost position as 92A and 92D to a rightmost position as 94A and 94D in FIG. 24 in one-half second.

FIGS. 2, 4, 5, 6, 16 and 19 are to scale to show quantitative relations of the parts.

A desirable characteristic of the particular linkage mechanism 79 is that it fits the body of the winding machine 120; this provides substantial clearance between the operator and the moving mechanism; thus it does not require a guard device to prevent an operator's hand or fingers being pinched in the gainer while it is in use. Other mechanisms could be designed to accomplish this same function, however, the simplicity of adjustment, lower initial cost and safety characteristics of the location of the traverse gear mechanism recommends its use in industrial applications where concern for speed, flexibility, reduced capital equipment costs and operator safety are considerations. The construction of the traverse gainer assembly mechanism 79 also, due to its compactness, allows adequate clearance on the winding machines for the safety vacuum hood and the knapping brush device that are used and are also in motion while the unit 120 is being operated. Excellent results as to uniformity of product that have been obtained using the traverse gainer mechanism for quality control as well as change of filter unit length.

It has long been recognized that a fast and simple means of changing filter tubes as 106 would be of great advantage in reducing manpower in changing plugged filters in industrial service. In larger industrial plants thousands of filter tubes must be changed in daily plant operation. The standard wound tube cannot be used in the filter housing that is designed for use of the "Extended Core" tube as in U.S. Pat. No. 3,319,793. Conversely, the "Extended Core" tube will not fit into the filter housing that is designed for the standard wound filter tube. With the present situation a firm must carry double inventory of wound tubes, even if the filters are used in similar service applications, i.e., one filter tube stock for the "Extended Core Equipped" filter housings and one filter tube stock for standard wound tube cases.

The core adapter 210 of FIG. 16 is an inexpensive and simple solution to this problem. It is a light weight perforated metal tube device that, when snapped into the end of any standard filter tube as 106, equipped with a core as 102, allows it (106) to be used in a filter case as 216 equipped to use "Extended Core" tubes. In plant emergencies, when no supply of "Extended Core" tubes are available, the core adapter 210 allows normal plant operation to continue by using easily available standard wound filter tubes. It is also a very economical device in that it (210) can be removed and reused as often as needed and discarded when its function is served.

The Core Adapter 210 is a perforated and crimped tube that is swaged down on either end as at 211 and 212 so that it will fit tightly into any standard diameter filter tube end as in FIG. 17. The lengths of the swaged sections 211 and 212 are controlled to stop the adapter 210 with a precise length of the device projecting from the end of the filter tube as in FIGS. 15 and 17. The projecting portion of the device 210 is sized such that it will fit into any standard filter bottom seat plate as 215 as in FIG. 15. The projecting portion of the adapter as 210 guides the filter tube 106 into place so a positive knife edge seal eliminates bypass of contaminant around the filter tube end. The largest diameter 213 of the Core Adapter 210 is carefully sized and is larger than the ends 211 and 212 to guarantee that the adapter will fit tightly into the wound filter tube as shown in FIG. 17, but not so tightly that it (210) may not be removed for re-use.

The apparatus 150 is a jig used for applying the adapter 210 to connect the filter assemblies as 105.

The apparatus 150 comprises a V-shaped frame 153 in which is located a holder 154 to a the cylindrical filter element a 105. A bottom centering support 155 is a rigid conical member with its central longitudinal axis of the cone parallel to the axis of the V-shaped frame 153. A top adapter holding member 152 has a support arm 158 therefor which arm is a rigid piston which is located in a cylinder 161 held in a piston assembly 151 at the upper end of frame 153 by an upper bracket 162 and a lower bracket 163 holding cylinder 161; and pneumatic lines 164 and 165 connect to the top and bottom of cylinder 161 and are controlled by a valve 159. A base 156 is adjustably attached to the frame 153 by a handle as 157. The base 156 supports the lower filter support 155.

The upper filter holder assembly 152 comprises a outer cylindrical skirt 168 and an inner conical portion 169 and a passage or annular space 178 therebetween. The annular space 178, the cylindrical skirt 168 and the conical 169 are coaxial and the longitudinal axes of those elements are coaxial with the longitudinal axis of the conical support 155 and with the axis of the piston arm 158 of the assembly 151.

The upper portion 166 of the multiple filter unit 110, which unit is composed of one poriton as 101 and a like unit as 106 each wound on a core as 102, is located above rest or support 154 and its lower portion, 167, is placed on the lower support 155. The handle 159 is then manipulated to move the support 152 upward. The bottom portion 212 of the adapter 210 is then loosely located in the core 102 of the unit 105 as shown in FIG. 9 and the upper portion of the adapter 210 is located within the space 178 between the conical point 169 and the skirt 168 of the skirt 152. The crenations of the portion 211 of the adapter 210 that projects upwardly thereinto is held smoothly between inner surface 171 of the skirt 168 and the outer surface 175 of the of the conical portion 169. The downward movement of the piston 158 to a position as in FIG. 10 forces portion 212 into the core 102, as shown in FIG. 17.

A pressure testing assembly 240 comprises a board 245 on which are supported filter unit holding apparatuses of different sizes, 241, 242, 243 and 244, the internal structure of which is as shown at 216 in FIG. 16. Air is passed into each of these under pressure. The pressure across the filter element tested is measured at a manometer 246 and the rate of fluid flow is through the filter element being tested is measured at flowmeter 247. Board 245 is rigid and flat and extends vertically.

Assembly 240 provides that filters once made, as 105, may be tested as to the pressure drop thereacross and appropriate changes in production then made, as well as providing for quality control. The diameter of each filter is, as shown in FIG. 18, measured by a go, no-go guage having a base arm 211, a fixed arm 212 and a movable arm 214. The movable arm 214 is set at a predetermined size once the pressure drop determined by apparatus 240 is provided for control of diameter of the product, as 105, of the apparatus 120 after the diameter corresponding to a particular desired filtering performance at a given winding pattern has been determined by testing apparatus as 240.

Forming apparatus 239 comprises a rigid male die 231 and a pneumatic cylinder 234 with an input pneumatic line 235 and an output pneumatic line 236. A central hollow annular guide 232 provides a support for a plurality of pneumatically actuated fingers as 250–255 and 237 and 238. These fingers surround the tube 230 and the die 231. The action of the apparatus 239 forms the perforated tube into a crenated connector as 211 as shown in FIGS. 16 and 17 exterior to a core as 102.

In the apparatus 239 the fingers as 250 and 251 are pneumatically actuated to deform the tube 230 into a crenated connector as is 211 as shown in FIGS. 12, 16 and 17.

Cylindrical tube 230 is firmly attached (as element 211 as shown in FIG. 17) to a core element as 102 which core is attached to a filter body as 110 as shown in FIG. 21. The formation into crenated form is for the purpose of assembly of the finished filter assembly product into a holder therefor as in FIG. 16. Such crenation structure as shown in FIGS. 12, 16, 17 and 25 is effected when the cylindrical assembly 110 with the core 102 having a cylindrical extension of that core, 230, is manipulated by an operator to place the extension 230 into a cavity 233 within the guide 232. Cavity 233 surrounds die 231 and is interior of the central location of fingers as 251-255. The action of fingers as 251-255 on all like portions of the tube 230, as shown in FIG. 25, produces a structure as shown in FIGS. 15 and 17 having a crenated extension as 211 attached to the core 102 but without appreciable stress applied to the core 102. Apparatus 239 avoids any deformation of the core 102 following the application of the body of yarn as 102 to that core. The core 102 is isolated from the action of the fingers as 250-255 on die 231 and on extension tube portion 230 because of the interposition of portion 213 of the extended portion 230 between the part of tube 230 acted on by the apparatus 239 and the part of the extension tube 230 firmly attached to core 102 before, during, and after action of apparatus 239 on that perforated tube 230.

To illustrate the operation of apparatus 239, the left hand portion (25A) of FIG. 25 shows the fingers as 251-255 withdrawn radially into holes therefor in ring 232 and tube 230 located in the space 233 while finger 250 is shown in contact with tube 230 as at the instant of forming crenations and fingers 237 and 238 are shown somewhat withdrawn from the tube 230 after it (230) is formed into the crenated shape of 211. The holes in tube 230 are not shown in FIG. 25 for purpose of clarity in view of the small size of FIG. 25: all fingers as 236, 237 and 250-255 shown in FIG. 25 are all alike in shape and size and euqally radially spaced around the axis of core 230 as are the crenations in portion 211.

The spacing of crenations shown in FIGS. 12 and 25 is diagrammatic. The spacing of crenations in FIGS. 16 and 17 is to scale. Core 102 has many equisized and equispaced holes in it as holes 260; portions 211 and 212 of adapter 210 are perforated and have many holes as 261 and 262, equisized and generally spaced as 260. Core 230 is perforated, has many holes in it, as 260, equispaced and equal size. FIG. 17 is to scale as to hole size and spacing.

I claim:

1. A system for producing and controlling the quality of wound filters said system comprising in operative combination, an apparatus for forming a filter tube and comprising a frame, a filter tube support means supported by a first shaft, a rotatable mounting means for said shaft, and a drive means attached to said first shaft, yarn guide support means extending and having a straight path of travel parallel to said first shaft, and a cam attached to a second shaft and drive means attached to said second shaft, said mounting means and said yarn guide means and said drive means supported on said frame, a cam arm attached to said cam, said yarn guide means movably supported on said yarn guide support means, said yarn guide means movable along a straight path parallel to but spaced away from said first shaft, and also comprising a yarn guide adjustment assembly comprising, in operative connection, a link assembly means located between said cam arm and said yarn guide means and operatively connected to said cam arm and to said yarn guide means, said link assembly means comprising an input link and a crank arm and an output link, said output link located between and pivotally connected to said crank arm and to said yarn guide support means, said input link located between and pivotally connected to said crank arm and to said cam arm, said cam arm extending parallel to said first shaft, a first pivotal connection between said input link and said crank arm and a second pivotal connection between said output link and said crank arm, a third pivotal connection between said input link and said cam arm, and a fourth pivotal connection between said output link and said yarn guide support means, said crank arm pivotally supported on said frame at a fifth pivotal connection, whereby said first pivotal connection moves in a first curved path which extends in the direction of the length of said straight path and said second pivotal connection moves in a second curved path different than said first curved path and which second curved path extends in the direction of the length of said first straight path, said third pivotal connection having a different length of travel and a different rate of speed and a different rate of acceleration and deacceleration than said fourth pivotal connection as measured parallel to the straight path of travel of said yarn guide means, said cam having an axis of rotation coaxial with said second shaft and said third pivotal connection between said input link and said cam arm is movable parallel to the length of said yarn guide support means and the first pivotal connection and the second pivotal connection are both sapced away from the fifth pivotal connection at distances that extend from said fifth pivotal connection in the same direction along the length of said crank arm, and an apparatus for testing the pressure drop across the finished filter tube at a given rate of fluid flow through said tube and means for measuring the diameter of product winding apparatus.

2. In an apparatus for forming a filter tube and comprising a frame, a filter tube support means supported by a first shaft, a rotatable mounting means for said shaft, and a drive means attached to said first shaft, yarn guide support means extending and having a straight path of travel parallel to said first shaft, and a cam attached to a second shaft and drive means attached to said second shaft, said mounting means and said yarn guide means and said drive means supported on said frame, a cam arm attached to said cam, said yarn guide means movably supported on said yarn guide support means, said yarn guide means movable along a straight path parallel to but spaced away from said first shaft, the improvement comprising a yarn guide adjustment assembly comprising, in operative connection, a link assembly means located between said cam arm and said yarn guide means and operatively connected to said cam arm and to said yarn guide means, said link assembly means comprising an input link and a crank arm and an output link, said output link located between and pivotally connected to said crank arm and to said yarn guide support means, said input link located between and pivotally connected to said crank arm and to said cam arm, said cam arm extending parallel to said first shaft, a first pivotal connection between said input link and said crank arm and a second pivotal connection between said output link and said crank arm, a third pivotal connection between said input link and said cam arm and a fourth pivotal connection between said output link and said yarn guide support means, said crank arm pivotally supported on said frame at a fifth pivotal connection, whereby said first pivotal connection moves in a first curved path which extends in the direction of the length of said straight path and said second pivotal connection moves in a second curved path different than said first curved path and which second curved path extends in the direction of the length of said first straight path, said third pivotal connection having a different length of travel and a different rate of speed and a different rate of acceleration and deacceleration than said fourth pivotal connection as measured parallel to the straight path of travel of said yarn guide means, said cam having an axis of rotation coaxial with said second shaft and said third pivotal connection between said input link and said cam arm is movable parallel to the length of said yarn guide support means and the first pivotal connection and the second pivotal connection are both spaced away from the fifth pivotal connection at distances that extend from said fifth pivotal connection in the same direction along the length of said crank arm.

3. Apparatus as in claim 2 wherein said crank arm extends in a direction transverse to the length of said filter support guide means and wherein the second pivotal attachment of said output link is adjustably located along the length of a first slot in the crank arm the length of which slot extends along the length of said crank arm.

4. Apparatus as in claim 3 wherein the first pivotal connection of the input link is attached to the crank arm along the length of a second slot in the crank arm, said second slot extending along the length of the crank arm.

5. Apparatus as in claim 2 wherein said crank arm extends in a direction transverse to the length of said filter support guide means and the first pivotal connection of the input link is attached to said crank arm along the length of a first slot in the crank arm extending along the length of said crank arm.

6. Apparatus as in claim 5 wherein the second pivotal connection of the output link to the crank arm is adjustably located along the length of a second slot in the crank arm extending along the length of the crank arm.

7. System as in claim 1 also comprising connector forming means for providing a formed connector extension on said filter tube.

8. System as in claim 7 wherein said connector forming means comprises a press means for selectively deforming one portion of an extension of the core of said filter tube, said portion extending beyond the body of yarn formed on said core, while mechanically isolating the core of said filter tube from stress produced by said press means.

* * * * *